US012597292B2

(12) United States Patent　　(10) Patent No.:　US 12,597,292 B2
Lee et al.　　　　　　　　　　(45) Date of Patent:　　　Apr. 7, 2026

(54) GAIT ANALYSIS APPARATUS AND METHOD

(71) Applicant: SEOUL NATIONAL UNIVERSITY R&DB FOUNDATION, Seoul (KR)

(72) Inventors: Je Hee Lee, Seoul (KR); Beom Seok Jeon, Seoul (KR); Jung Hwan Shin, Seoul (KR); Ri Yu, Hwaseong-si (KR)

(73) Assignee: Seoul National University R&DB Foundation, Seoul (KR)

( * ) Notice: Subject to any disclaimer, the term of this patent is extended or adjusted under 35 U.S.C. 154(b) by 196 days.

(21) Appl. No.: 18/374,170

(22) Filed: Sep. 28, 2023

(65) Prior Publication Data

US 2024/0221428 A1　　Jul. 4, 2024

Related U.S. Application Data

(63) Continuation of application No. PCT/KR2022/001374, filed on Jan. 26, 2022.

(30) Foreign Application Priority Data

Mar. 29, 2021　(KR) ........................ 10-2021-0040387

(51) Int. Cl.
*G06V 40/20* (2022.01)
*G06T 7/73* (2017.01)

(52) U.S. Cl.
CPC ............... *G06V 40/25* (2022.01); *G06T 7/73* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

2023/0237695 A1*　7/2023　Li ............................. G06T 7/74
2024/0221428 A1*　7/2024　Lee .......................... A61B 5/11

FOREIGN PATENT DOCUMENTS

JP　　2009-189671 A　　8/2009
KR　　10-1775480 B1　　9/2017
(Continued)

OTHER PUBLICATIONS

Physics-Based Reconstruction and Analysis of Human Movement from Video. Yu (Year: 2021).*
(Continued)

*Primary Examiner* — Delomia L Gilliard
(74) *Attorney, Agent, or Firm* — NSIP Law

(57) ABSTRACT

A gait analysis method includes collecting a two-dimensional gait video of a subject's gait situation during a preset time, which is captured using a camera; generating a three-dimensional coordinate system based on at least one frame of the two-dimensional gait video by receiving three-dimensional information of a capturing space; calculating three-dimensional feature point coordinates by receiving a plurality of feature points on the three-dimensional coordinate system, and calculating two-dimensional feature point coordinates for the plurality of feature points using resolution information of the camera; estimating mapping information between the three-dimensional feature point coordinates and the two-dimensional feature point coordinates; calculating a plurality of two-dimensional joint position information for the subject from the two-dimensional gait video; calculating a plurality of three-dimensional joint position information corresponding to the plurality of two-dimensional joint position information; and calculating gait parameters for the subject using the three-dimensional joint position information.

20 Claims, 9 Drawing Sheets

(56)  References Cited

FOREIGN PATENT DOCUMENTS

KR          10-2175573  B1     11/2020
WO     WO 2022/211244  A1     10/2022

OTHER PUBLICATIONS

"Physics-Based Reconstruction and Analysis of Human Movement from Video," Seoul National University, Feb. 2021, (129 Pages in English, 2 Pages in Korean).
Stenum, Jan, et al., "Two-Dimensional Video-Based Analysis of Human Gait Using Pose Estimation," PLOS Computational Biology, Apr. 23, 2021, (26 Pages in English).
International Search Report No. PCT/KR2022/001374 Issued On Jul. 5, 2022 (2 Pages in English).

* cited by examiner

A

Step Length (cm)

***

120
100
80
60
40
20
0

Med off   Med on

B

Cadence (steps/min)

200

150

100

50

0

Med off   Med on

C

Cadence (steps/min)

***

2.5
2
1.5
1
0.5
0

Med off   Med on

D

Number of step for turning

**

12
10
8
6
4
2
0

Med off   Med on

E

Turning time (s)

**

5

4

3

2

1

0

Med off   Med on

F

Step length variability

80

60

40

20

0

Med off   Med on

START

COLLECT TWO-DIMENSIONAL GAIT VIDEO INFORMATION — S1310

CALCULATE POSITION INFORMATION FOR BACKGROUND POINT — S1320

ESTIMATE MAPPING INFORMATION — S1330

CALCULATE PLURALITY OF TWO-DIMENSIONAL JOINT POSITION INFORMATION — S1340

CALCULATE PLURALITY OF THREE-DIMENSIONAL JOINT POSITION INFORMATION — S1350

CALCULATE GAIT PARAMETERS — S1360

END

GAIT ANALYSIS APPARATUS AND METHOD

CROSS REFERENCE TO RELATED APPLICATIONS

This application claims priority to and the benefit of PCT Patent Application No. PCT/KR2022/001374 filed on Jan. 26, 2022, and Korean Patent Application No. 10-2021-0040387 filed in the Korean Intellectual Property Office on Mar. 29, 2021, the entire contents of which are incorporated herein by reference.

BACKGROUND

1. Field

The present disclosure relates to a gait analysis apparatus and method for quantitatively analyzing the gait of a subject using a two-dimensional video.

2. Description of the Related Art

Gait is an important motor function that is indispensable for independent daily life, and gait disorders occur in neurodegenerative diseases such as Parkinson's disease, which is an important factor that greatly reduces the quality of life of patients, so it is important to detect gait abnormalities early and monitor them in the long term. In addition, there must be a technology to objectively determine the progression or improvement of such gait abnormalities, so that the results of clinical trials related to new drugs that may improve gait abnormalities may be trusted.

Currently, there are two main methods used to evaluate gait abnormalities: the first is a scale system subjectively evaluated by medical staff, and the second is a method of objectively measuring gait by wearing a sensor (e.g., accelerometer, gyroscope, or pressure sensor) or walking on the sensor. The scale system evaluated by medical staff is difficult to guarantee objectivity because the evaluation itself is subjective, and it is not highly reliable even among experienced specialists. As for the second sensor-based system, numerous equipment and algorithms have been developed, but the following limitations exist. First, the sensor must be attached to the body, and there is a possibility that attaching the sensor to the body may affect the subject's movement. In addition, because sensors must be attached to the body, it is difficult to perform on a large number of subjects and causes a financial burden on the subjects. In addition, the sensor attachment position must be matched for each subject, and for accurate analysis, it is necessary to attach sensors to various areas, which is not easy to control. Therefore, to overcome this problem, the development of technology that allows for objective evaluation in a more accessible and non-contact manner is required.

The above-mentioned background technology is technical information that the inventor possessed for deriving the present disclosure or acquired in the process of deriving the present disclosure, and cannot necessarily be said to be known art disclosed to the general public before filing the application for the present disclosure.

Prior Art 1: Korea Patent Publication No. 10-2175573 (Nov. 9, 2020)

SUMMARY

One object of the present disclosure is to configure the movement of the leg joints in three dimensions using a posture measurement algorithm from a two-dimensional video taken with a camera without a marker or sensor to be attached, and to obtain quantitative gait parameters that could be obtained based on existing sensors.

The problem to be solved by the present disclosure is not limited to the problems mentioned above, and other problems and advantages of the present disclosure that are not mentioned may be understood through the following description and may be understood more clearly through the examples of the present disclosure. In addition, it may be seen that the problems and advantages to be solved by the present disclosure may be realized by the means and combinations thereof indicated in the claims.

A gait analysis method for analyzing gait of a subject according to an embodiment of the present disclosure includes collecting a two-dimensional gait video of a subject's gait situation during a preset time, which is captured using a camera; generating a three-dimensional coordinate system based on at least one frame of the two-dimensional gait video by receiving three-dimensional information of a capturing space; calculating three-dimensional feature point coordinates by receiving a plurality of feature points on the three-dimensional coordinate system, and calculating two-dimensional feature point coordinates for the plurality of feature points using resolution information of the camera; estimating mapping information between the three-dimensional feature point coordinates and the two-dimensional feature point coordinates by using the three-dimensional feature point coordinates, the two-dimensional feature point coordinates, and the internal index of the camera; calculating a plurality of two-dimensional joint position information for the subject from the two-dimensional gait video; calculating a plurality of three-dimensional joint position information corresponding to the plurality of two-dimensional joint position information using the plurality of two-dimensional joint position information, the internal index of the camera, and the mapping information; and calculating gait parameters for the subject using the three-dimensional joint position information.

A gait analysis apparatus for analyzing gait of a subject according to an embodiment of the present disclosure includes a processor; and a memory that is operatively connected to the processor and stores one or more instructions executed by the processor, wherein when the memory is executed through the processor, the instruction causes the processor to collect a two-dimensional gait video of a subject's gait situation during a preset time, which is captured using a camera, generate a three-dimensional coordinate system based on at least one frame of the two-dimensional gait video by receiving three-dimensional information of a capturing space, calculate three-dimensional feature point coordinates by receiving a plurality of feature points on the three-dimensional coordinate system, and calculate two-dimensional feature point coordinates for the plurality of feature points using resolution information of the camera, estimate mapping information between the three-dimensional feature point coordinates and the two-dimensional feature point coordinates by using the three-dimensional feature point coordinates, the two-dimensional feature point coordinates, and the internal index of the camera, calculate a plurality of two-dimensional joint position information for the subject from the two-dimensional gait video, calculate a plurality of three-dimensional joint position information corresponding to the plurality of two-dimensional joint position information using the plurality of two-dimensional joint position information, the internal index of the camera, and the mapping information, and calculate gait parameters for the subject using the three-dimensional joint position information.

In addition, another method, another system, and a computer-readable recording medium storing a computer program for executing the method for implementing the present disclosure may be further provided.

Other aspects, features and advantages in addition to those described above will become apparent from the following drawings, claims and detailed description of the invention.

According to the present disclosure, it is possible to acquire the quantitative parameters related to gait by measuring the position of the patient's joints in the two-dimensional video in which the gait is captured, projecting the position of the joints into the three-dimensional space in which the patient walks, and calculating the distance (depth) of the subject's feet from the camera.

In addition, it has the advantage of being very easily accessible by using the two-dimensional video that may be easily accessed by anyone, without the need for a marker and a sensor to be attached as in the past for gait analysis.

In addition, quantitative analysis of walking is possible anytime, anywhere. Therefore, it is possible to objectively evaluate the symptoms of patients with gait abnormalities and easily monitor gait abnormalities in daily life over a long period of time. Therefore, it may be used as an important index in establishing treatment strategies for related diseases and evaluating response to treatment.

In addition, it is possible to evaluate objectively and reliably the effectiveness in clinical trials of related diseases.

In addition, the apparatus and method may be importantly used to patients in situations where social distancing is required (e.g., covid-19) or who cannot easily access hospitals, for remote medical treatment.

In addition, by applying this algorithm long-term to normal people, gait abnormalities may be detected early and contribute to the early diagnosis of related diseases.

The effects of the present disclosure are not limited to those mentioned above, and other effects not mentioned will be clearly understood by those skilled in the art from the description below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The advantages and features of the present disclosure and methods for achieving them will become clear by referring to the embodiments described in detail together with the accompanying drawings. However, the present disclosure is not limited to the embodiments presented below, but may be implemented in various different forms, and should be understood to include all conversions, equivalents, and substitutes included in the spirit and technical scope of the present disclosure. The embodiments presented below are provided to ensure that the disclosure of the present disclosure is complete and to fully inform those skilled in the art of the scope of the invention. In describing the present disclosure, if it is determined that a detailed description of related known technologies may obscure the gist of the present disclosure, the detailed description will be omitted.

The terms used in this application are only used to describe specific embodiments and are not intended to limit the present disclosure. Singular expressions include plural expressions unless the context clearly dictates otherwise. In this application, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. Terms such as first, second, etc. may be used to describe various components, but the components have not been limited by these terms. The above terms are used only for the purpose of distinguishing one component from another.

In addition, in this application, the "portion" may be a hardware component, such as a processor or circuit, and/or a software component executed by the hardware component, such as a processor.

Hereinafter, embodiments according to the present disclosure will be described in detail with reference to the accompanying drawings. In the description with reference to the accompanying drawings, identical or corresponding components are assigned the same drawing numbers and duplicate descriptions thereof are omitted.

Figure 1:
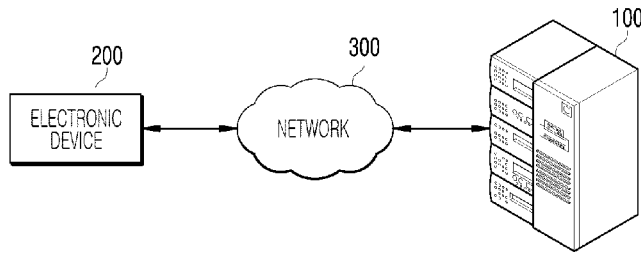
FIG. 1 is an exemplary diagram of a gait analysis environment including an electronic device, a gait analysis apparatus, and a network connecting them, according to the present embodiment.

FIG. 1 is an exemplary diagram of a gait analysis environment including an electronic device, a gait analysis apparatus, and a network connecting them, according to the present embodiment. With reference to FIG. 1, the gait analysis environment may include a gait analysis apparatus 100, an electronic device 200, and a network 300.

The gait analysis apparatus 100 may collect a two-dimensional gait video from the electronic device 200. The electronic device 200 may transmit a two-dimensional gait video captured of the subject's gait situation for a preset time to the gait analysis apparatus 100 using a camera (not illustrated) installed therein.

In the present embodiment, the two-dimensional gait video includes a first gait section in which the subject walks forward in a straight line a preset distance (e.g., 5 m or 7 m) from the starting point toward the camera, a second gait section in which the subject walks to turn a direction while passing through a direction turning point after the first gait section, and a third gait section in which the subject walks backward to return to the starting point after the second gait section.

The gait analysis apparatus 100 may receive three-dimensional information (first to third parameters described later) and the starting point of the capturing space, and generate a three-dimensional coordinate system based on at least one frame of the two-dimensional gait video collected from the electronic device 200.

The gait analysis apparatus 100 may receive a plurality of feature points in the three-dimensional coordinate system, calculate the three-dimensional feature point coordinates, and calculate the two-dimensional feature point coordinates for the plurality of feature points using resolution information of the camera for at least one frame of the two-dimensional gait video.

The gait analysis apparatus 100 may estimate mapping information between the three-dimensional feature point coordinates and the two-dimensional feature point coordinates using the three-dimensional feature point coordinates, the two-dimensional feature point coordinates, and an internal index of the camera. Here, the Perspective-n-point (PNP) algorithm may be used to calculate mapping information. The PNP algorithm is an algorithm that may estimate the position and the direction of the camera (rotation information and horizontal movement information) calibrated when four or more points are known, which correspond to the coordinates of a specific three-dimensional space (three-dimensional feature point coordinates in the present embodiment) and a specific image plane (two-dimensional gait video frame in the present embodiment).

In the present embodiment, the internal index of the camera may include focal length information given based on the resolution of the camera and center information of the image frame included in the two-dimensional gait video. From this, the gait analysis apparatus 100 may estimate mapping information (rotation information and horizontal movement information) of the camera calibrated from four or more corresponding points (feature points) from three-dimensional to two-dimensional.

The gait analysis apparatus 100 may calculate a plurality of two-dimensional joint position information for the subject from the two-dimensional gait video. The gait analysis apparatus 100 may extract a total of 25 joints from the two-dimensional gait video, such as eyes, ears, shoulders, elbows, wrists, pelvis, knees, ankles, big toes, little toes, and heels (two on the left and right), nose, and neck, and extract the corresponding joint position information from the two-dimensional gait video. Algorithms used here may include open source algorithms, including Openpose.

The gait analysis apparatus 100 may calculate a plurality of three-dimensional joint position information corresponding to the plurality of two-dimensional joint position information using a plurality of two-dimensional joint position information, the internal index of the camera, and mapping information. In the present embodiment, the above-described PNP algorithm may be used to calculate three-dimensional joint position information.

The gait analysis apparatus 100 may calculate gait parameters for a subject using three-dimensional joint position information. In the present embodiment, the gait parameters may include step length, gait velocity, number of strides per hour, variability of step length and gait velocity, difference between left and right step lengths, direction turning time as direction turning information, and number of strides at the direction turning time.

In the present embodiment, the gait analysis apparatus 100 may exist independently in the form of a server, or the gait analysis function provided by the gait analysis apparatus 100 may be implemented in the form of an application and mounted on the electronic device 200.

The electronic device 200 may receive a gait analysis service by accessing a gait analysis application and/or a gait analysis site provided by the gait analysis apparatus 100. This electronic device 200 is a device that may perform the functions of a computing device (not illustrated) and is equipped with a camera, and include, for example, desktop computer, smartphone, tablet PC, laptop, camcorder, webcam, etc.

The network 300 may serve to connect the gait analysis apparatus 100 and the electronic device 200. The network 300 includes, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communications, but the scope of the present disclosure is not limited thereto. In addition, the network 300 may transmit and receive information using short-range communication and/or long-distance communication. Here, short-range communication may include Bluetooth, radio frequency identification (RFID), infrared data association (IrDA), ultra-wideband (UWB), ZigBee, and wireless fidelity (Wi-Fi) technology, Long-distance communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 300 may include connections of network elements such as hubs, bridges, routers, and switches. The network 300 may include one or more connected networks, including public networks such as the Internet and private networks such as secure enterprise private networks, for example, a multi-network environment. Access to the network 300 may be provided through one or more wired or wireless access networks. Furthermore, the network 300 may support an Internet of Things (IoT) network and/or 5G communication that exchanges and processes information between distributed components such as objects.

Figure 2:
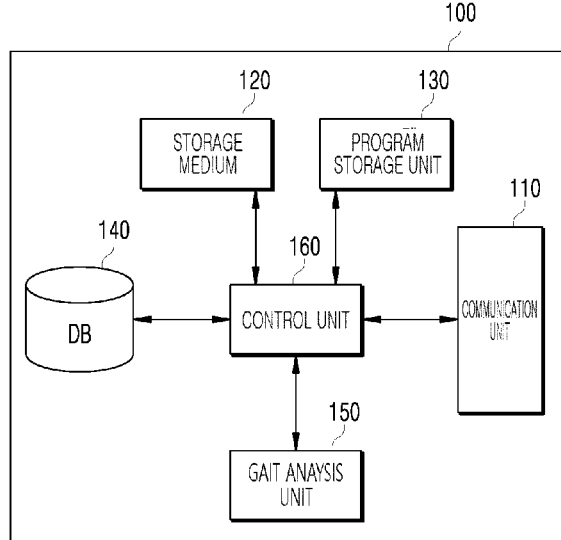
FIG. 2 is a block diagram schematically illustrating a configuration of a gait analysis apparatus according to the present embodiment.

FIG. 2 is a block diagram schematically illustrating a configuration of the gait analysis apparatus according to the present embodiment. In the following description, parts that overlap with the description of FIG. 1 will be omitted. With reference to FIG. 2, the gait analysis apparatus 100 may include a communication unit 110, a storage medium 120, a program storage unit 130, a database 140, a gait analysis unit 150, and a control unit 160.

The communication unit 110 may provide a communication interface necessary to provide transmission and reception signals between the gait analysis apparatus 100 and the electronic device 200 in the form of packet data in conjunction with the network 300. Furthermore, the communication unit 110 may serve to receive a predetermined information request signal from the electronic device 200 and transmit the information processed by the gait analysis unit 150 to the electronic device 200. Here, the communication network refers to a medium that serves to connect the gait analysis apparatus 100 and the electronic device 200, and may include a route that provides a connection route such that the electronic device 200 transmits and receives information after connecting to the gait analysis apparatus 100. In addition, the communication unit 110 may be a device that includes hardware and software necessary to transmit and receive signals such as control signals or data signals through wired or wireless connections with other network devices.

The storage medium 120 functions to temporarily or permanently store data processed by the control unit 160. Here, the storage medium 120 may include magnetic storage media or flash storage media, but the scope of the present disclosure is not limited thereto.

The program storage unit 130 is equipped with control software that performs an operation of collecting the two-dimensional gait videos captured during a preset period of the subject's gait situation using the camera, an operation of receiving three-dimensional information of the capturing space to generate the three-dimensional coordinate system based on at least one frame of the two-dimensional gait video, an operation of receiving a plurality of feature points on the three-dimensional coordinate system and calculating three-dimensional feature point coordinates, and calculating the two-dimensional feature point coordinates for the plurality of feature points using the resolution information of the camera for at least one frame of the two-dimensional gait video, an operation of estimating mapping information between the three-dimensional feature point coordinates and the two-dimensional feature point coordinates using the three-dimensional feature point coordinates, the two-dimensional feature point coordinates, and the internal index of the camera, an operation of calculating a plurality of three-dimensional joint position information corresponding to a plurality of two-dimensional joint position information using the plurality of two-dimensional joint position information, the internal index of the camera, and mapping information, and an operation of calculating the gait parameters for the subject using the three-dimensional joint position information.

The database 140 may include a management database that stores the two-dimensional gait video collected from the electronic device 200, capturing space information (first parameter to third parameter) in the two-dimensional gait video, a plurality of feature point information corresponding to the capturing space information, PNP algorithm, Openpose algorithms, etc.

The database 140 may include a user database that stores information on the subject who will receive gait analysis service. Here, the information on the subject may include basic information on the subject's name, affiliation, personal information, gender, age, contact information, email, address, image, etc., and information on subject's connection (login) such as the subject's authentication (ID) (or email) and password, country of access, position of access, information on the device used for access, connected network environment, etc.

In addition, the user database may store the subject's unique information, information and/or category history provided by the subject who accessed the gait analysis application and/or gait analysis site, environmental setting information set by the subject, resource usage information used by the subject, and the information on billing and payment corresponding to resource usage of the subject.

The gait analysis unit 150 may collect the two-dimensional gait videos of the subject's gait situation during a preset period of time using a camera. The gait analysis unit 150 may receive three-dimensional information of the capturing space to generate the three-dimensional coordinate system based on at least one frame of the two-dimensional gait video. The gait analysis unit 150 may receive a plurality of feature points on the three-dimensional coordinate system to calculate the three-dimensional feature point coordinates, and may calculate the two-dimensional feature point coordinates for the plurality of feature points using the resolution information of the camera for at least one frame of the two-dimensional gait video. The gait analysis unit 150 may estimate mapping information between the three-dimensional feature point coordinates and the two-dimensional feature point coordinates using the three-dimensional feature point coordinates, the two-dimensional feature point coordinates, and the internal index of the camera. The gait analysis unit 150 may calculate the plurality of two-dimensional joint position information for the subject from the two-dimensional gait video. The gait analysis unit 150 may calculate the plurality of three-dimensional joint position information corresponding to the plurality of two-dimensional joint position information using the plurality of two-dimensional joint position information, the internal index of the camera, and the mapping information. The gait analysis unit 150 may calculate the gait parameters for the subject using the three-dimensional joint position information.

The control unit 160 is a type of central processing unit and may control the entire operation of the gait analysis apparatus 100 by driving control software mounted on the program storage unit 130. The control unit 160 may include all types of devices that may process data, such as a processor. Here, the 'processor' may mean, for example, a data processing device built into hardware that has a physically structured circuit to perform a function expressed by code or instructions included in a program. Examples of data processing devices built into hardware may include a microprocessor, central processing unit (CPU), processor core, multiprocessor, and application-specific integrated circuit (ASIC), field programmable gate array (FPGA), etc., but the scope of the present disclosure is not limited thereto.

Figure 3:
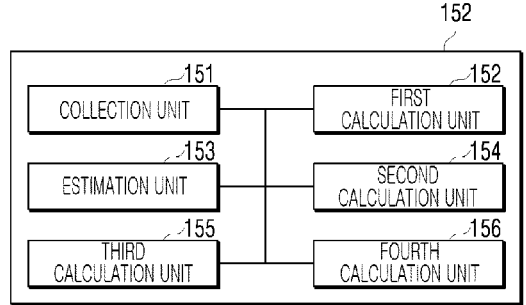
FIG. 3 is a block diagram schematically illustrating a configuration of a gait analysis unit of the gait analysis apparatus of FIG. 2.

FIG. 3 is a block diagram schematically illustrating the configuration of the gait analysis unit of the gait analysis apparatus of FIG. 2, and FIGS. 4, 5, 6, 7, 8, 9, 10 and 11 are exemplary diagrams for explaining gait analysis according to the present embodiment. In the following description, parts that overlap with the description of FIGS. 1 and 2 will be omitted. With reference to FIGS. 3 to 11, the gait analysis unit 150 may include a collection unit 151, a first calculation unit 152, an estimation unit 153, a second calculation unit 154, a third calculation unit 155, and a fourth calculation unit 156.

Figure 4:
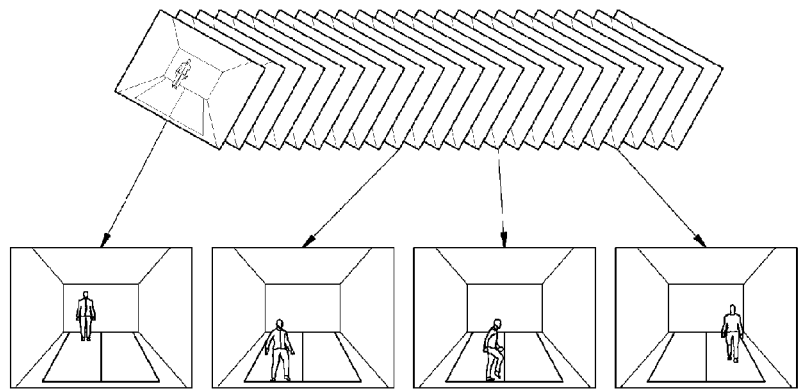
FIGS. 4, 5, 6, 7, 8, 9, 10 and 11 are exemplary diagrams for explaining gait analysis according to the present embodiment.

The collection unit 151 may collect a two-dimensional gait video from the electronic device 200. Here, the two-dimensional gait video is captured using the camera that captures the subject's gait situation for a preset time, and may include the first gait section in which the subject walks forward in a straight line a preset distance (e.g., 5 m or 7 m) from the starting point toward the camera, the second gait section in which the subject walks to turn a direction while passing through the direction turning point after the first gait section, and the third gait section in which the subject walks backward to return to the starting point after the second gait section. FIG. 4 illustrates the two-dimensional gait video collected by the collection unit 151. In the present embodiment, the two-dimensional gait video may be interpreted as a two-dimensional gait video frame or a set of two-dimensional gait video frames.

In the present embodiment, the collection unit 151 may determine whether the two-dimensional gait video satisfies a preset condition to allow collection of two-dimensional video data that satisfies the preset condition. Here, the preset conditions may include first to third conditions. The first condition may include a condition in which the camera has to capture an image at a fixed position. The second condition may include a condition in which the subject's feet has to be included in the two-dimensional gait video. The third condition may include a condition in which a zoom-in or zoom-out operation is not performed while capturing the two-dimensional gait video. The collection unit 151 may disallow collection of two-dimensional gait video data if the two-dimensional gait video does not satisfy the first to third conditions.

The first calculation unit 152 may receive the three-dimensional information of the capturing space to generate the three-dimensional coordinate system based on at least one frame of the collected two-dimensional gait video. In order to generate the three-dimensional coordinate system, the first calculation unit 152 may request the subject or photographer to input three-dimensional information of the capturing space and the starting point of the three-dimensional coordinate system through the electronic device 200, and the subject or photographer may receive the three-dimensional information of the capturing space and the starting point of the three-dimensional coordinate system input into the electronic device 200 to generate the three-dimensional coordinate system.

Figure 5:
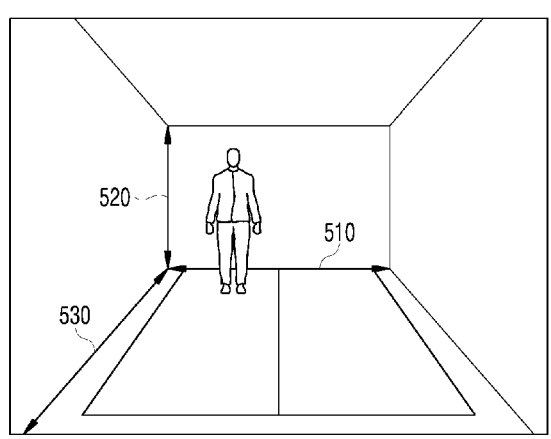

Here, the capturing space information may include first to third parameters. FIG. 5 illustrates an example of inputting capturing space information using the two-dimensional gait video frame as an example. In FIG. 5, the first parameter 510 may represent a width (e.g., 4 m) of a floor corresponding to the starting point within the capturing space. The second parameter 520 may represent a height (e.g., 3 m) of the wall in contact with the width of the floor. The third parameter 530 may represent a distance (e.g., 7 m) between the starting point and the direction turning point. In addition, the starting point of the three-dimensional coordinate system may be received by touching on at least one frame of the two-dimensional gait video.

The first calculation unit 152 may receive a plurality of feature points on the three-dimensional coordinate system, calculate the three-dimensional feature point coordinates, and calculate the two-dimensional feature point coordinates for the plurality of feature points using the resolution information of the camera for at least one frame of the two-dimensional gait video.

In the present embodiment, calculating the plurality of three-dimensional feature point coordinates and the plurality of corresponding two-dimensional feature point coordinates is to acquire the mapping information (rotation information and horizontal movement information of the camera) between three-dimensional feature points and two-dimensional feature points using the PNP algorithm.

The first calculation unit 152 may request the subject or the photographer to input a plurality of feature points corresponding to the capturing space information through the electronic device 200, and receive a plurality of corresponding feature point input results corresponding to the capturing space information input by the subject or the photographer through the electronic device 200.

Figure 6:
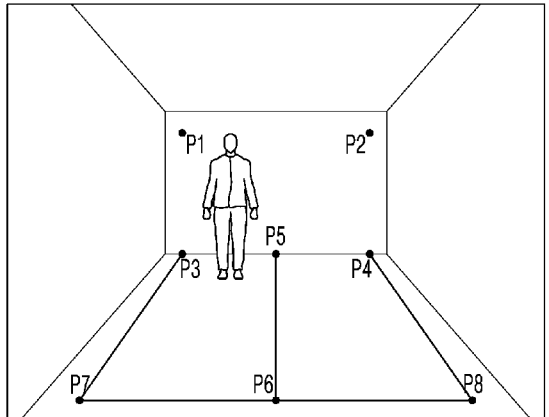

FIG. 6 illustrates an example in which the subject or photographer inputs a plurality of feature points on any one two-dimensional gait video frame displayed on the electronic device 200 upon request. From FIG. 6, it may be seen that eight feature points (P1 to P8) are received, and the starting point of the coordinate system with the feature point P5 as (0,0,0) may also be received. The more feature points, the better the accuracy of mapping information may be. The first calculation unit 152 may calculate a plurality of three-dimensional feature point coordinates (e.g., (A,B,C)) for a plurality of feature points using the three-dimensional coordinate system.

The first calculation unit 152 may calculate two-dimensional feature point coordinates (e.g., (a,b)) for a plurality of feature points (eight feature points (P1 to P8) in FIG. 6) using already known resolution information of the camera (number of horizontal and vertical pixels of the two-dimensional gait video frame).

The estimation unit 153 may estimate mapping information between the three-dimensional feature point coordinates and the two-dimensional feature point coordinates by applying the three-dimensional feature point coordinates, the two-dimensional feature point coordinates, and the internal index of the camera to the PNP algorithm. Here, estimating the mapping information may include acquiring a link between the three-dimensional feature points on the three-dimensional coordinate system and the two-dimensional feature points on the two-dimensional gait video frame.

The estimation unit 153 may estimate mapping information (R/T), rotation information and horizontal movement information of the camera using Equation 1 below, which represents the PNP algorithm.

$$sp_{image} = K[R|T]p_{world} \qquad \text{[Equation 1]}$$

$$K = \begin{bmatrix} f_x & 0 & u_0 \\ 0 & f_y & v_0 \\ 0 & 0 & 1 \end{bmatrix}$$

In Equation 1, s represents a scale index (scale factor), $p_{image}$ represents the two-dimensional feature point coordinates, K represents the given camera internal index, [R/T] represents an external factor of the camera, that is, mapping information, and $p_{world}$ represents the three-dimensional feature point coordinates. In the camera internal index K, and $f_x$ and $f_y$ represent focal lengths given by empirically calculating based on the resolution of the camera, and $u_0$ and $v_0$ are the center information of the two-dimensional video frame. For example, if the resolution of the two-dimensional video frame is 1920×1080, $u_0$ may be 960 (1920/2), and $v_0$ may be 540 (1080/2).

In the present embodiment, it is described that the mapping information is estimated after collecting the two-dimensional gait video. However, the two-dimensional gait video may be collected after first estimating the mapping information in the capturing space where the gait parameters is calculated.

The second calculation unit 154 may calculate a plurality of two-dimensional joint position information for the subject from the two-dimensional gait video. The second calculation unit 154 may extract a total of 25 joints from the two-dimensional gait video, such as eyes, ears, shoulders, elbows, wrists, pelvis, knees, ankles, big toes, little toes, and heel (two on the left and right), nose, and neck, and extract the corresponding joint position information from the two-dimensional gait video. The second calculation unit 154 may calculate two-dimensional joint position information using open source algorithms including Openpose.

In the present embodiment, not all of the plurality of two-dimensional joint position information but only some information is used to calculate the gait parameters, thereby capable of extracting position information of the both feet including the big toe, little toe, and ankle, and position information of the both shoulders from the two-dimensional joint position information.

The third calculation unit 155 may calculate a plurality of three-dimensional joint position information by applying the plurality of two-dimensional joint position information, the internal index of the camera, and the mapping information to the PNP algorithm. In the above-mentioned Equation 1, s represents the scale factor, $p_{image}$ represents the position information of the both feet including the big toe, little toe, and ankle, and the position information of both shoulders as the two-dimensional joint position information calculated by the second calculation unit 154, K represents the given camera internal index, [R/T] represents the external factor of the camera, that is, mapping information (rotation information and horizontal movement information of the camera). The third calculation unit 155 may calculate $p_{world}$, that is, the position information of the both feet including the big toe, little toe, and ankle, and the position information of both shoulders as three-dimensional joint position information by applying these to Equation 1.

Figure 7:
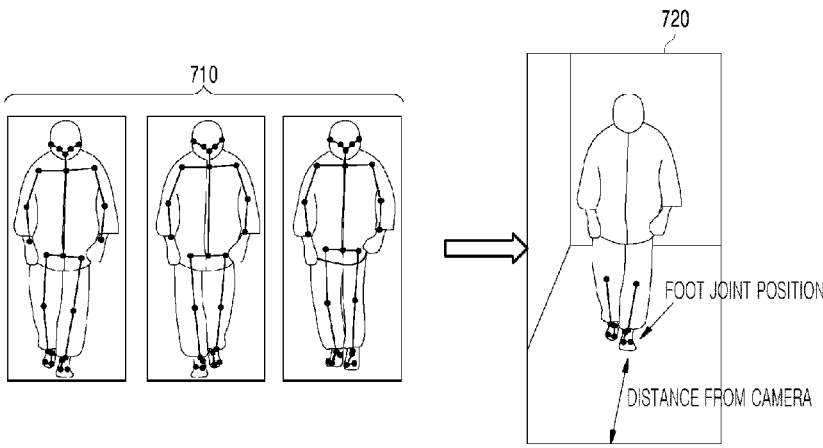

FIG. 7 illustrates an example of calculating three-dimensional joint position information using two-dimensional joint position information. The third calculation unit 155 applies the position information of the both feet including the big toe, little toe, and ankle and the position information of both shoulders as two-dimensional joint position information 710 from FIG. 7 to the PNP algorithm to calculate a distance (depth) from the camera for the position information of the both feet including the big toe, little toe, and ankle and the position information of both shoulders as three-dimensional joint position information 720.

The fourth calculation unit 156 may calculate the gait parameters for the subject using the three-dimensional joint position information calculated by the third calculation unit 155. Here, the gait parameters may include step length, gait velocity, number of strides per hour, variability of step length and gait velocity, difference between left and right step lengths, direction turning time as direction turning information, and number of strides at the direction turning time.

The fourth calculation unit 156 may generate a velocity graph for the both feet using the three-dimensional position information of the both feet among the three-dimensional joint position information calculated by the third calculation unit 155, and the distance and time corresponding to those between the start of the first gait section to the completion of the third gait section.

Figure 8:
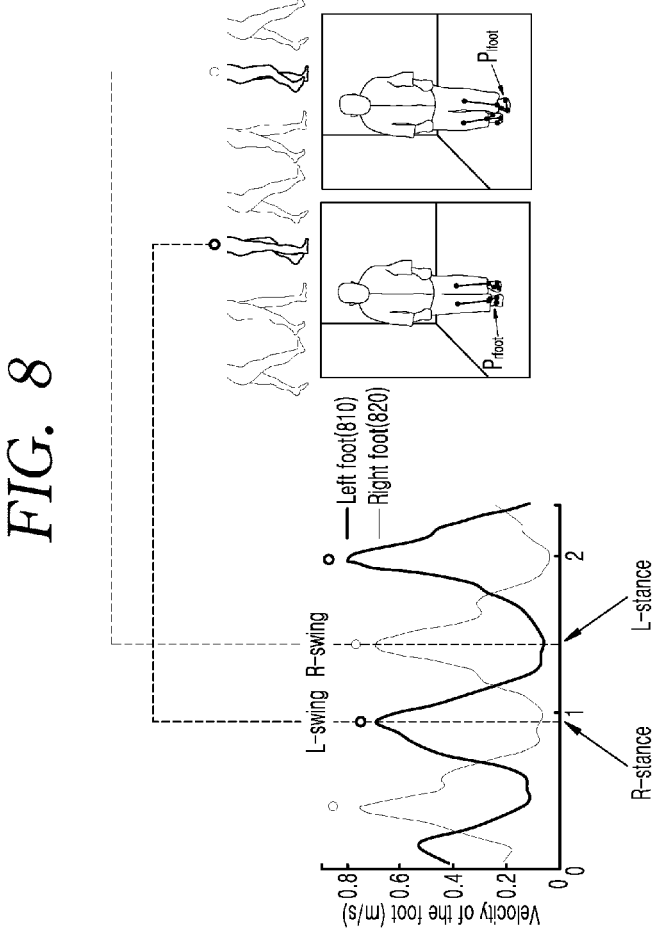

FIG. 8 illustrates a velocity graph for the both feet generated by the fourth calculation unit 156 using the three-dimensional position information of the both feet, and the distance and time corresponding to those between the start of the first gait section to the completion of the third gait section. In FIG. 8, a first graph 810 may represent a velocity graph for the left foot, and a second graph 820 may represent a velocity graph for the right foot.

The fourth calculation unit 156 may set a first period in which one foot moves at the fastest velocity as a swing phase on the velocity graph, and a second period in which the other foot comes into contact with the ground corresponding to the first period as a stance phase.

On the velocity graph of FIG. 8, the swing phase, which is the first period in which the left foot moves at the fastest velocity, is illustrated as L-swing, and the stance phase, which is the second period in which the right foot comes into contact with the ground, is illustrated as R-stance. Likewise, the swing phase, which is the first period in which the right foot moves at the fastest velocity, is illustrated as R-swing, and the stance phase, which is the second period in which the left foot comes into contact with the ground, is illustrated as L-stance.

The fourth calculation unit 156 may calculate the gait parameters including one or more of step length, gait velocity, number of strides per hour, variability of step length and gait velocity, and difference between left and right step lengths using the swing phase (L-swing and R-swing) and the stance phase (L-stance and R-stance) for each of both feet.

The fourth calculation unit 156 may calculate the step length as the distance between two stance phases for one foot. For example, the fourth calculation unit 156 may calculate the distance between any one stance phase (L-stance) and the next stance phase (L-stance) for the left foot from FIG. 8.

The fourth calculation unit 156 may calculate the gait velocity as the sum of the step lengths as the distance walked per unit time (e.g., 1 second). In the present embodiment, the fourth calculation unit 156 may calculate the gait velocity for the first gait section, the gait velocity for the second gait section, and the gait velocity for the third gait section, respectively. For example, the fourth calculation unit 156 may calculate the gait velocity for the first gait section by dividing the distance the subject moves (sum of step lengths) in the first gait section by the time taken.

The fourth calculation unit 156 may calculate the number of strides as the number of swing phases (L-swing and R-swing) per unit time.

The fourth calculation unit 156 may calculate the variability of step length and gait velocity by dividing the standard deviation of the step length and gait velocity by the average step length or average gait velocity ([standard deviation of step length and gait velocity/average step length (gait velocity))]×100).

The fourth calculation unit 156 may calculate the difference between the left and right step lengths as the difference between the step length calculated for the left foot and the step length calculated for the right foot of the both feet.

The fourth calculation unit 156 may calculate direction turning information including the direction turning time from the second gait section and the number of strides at the direction turning time using the three-dimensional position information of both shoulders, and provide the calculated direction turning information to the gait parameters. In general, in the case of subjects with gait disabilities, calculation of direction turning time may be important because they are unable to perform direction turning or the direction turning performance time is prolonged.

The fourth calculation unit 156 may generate change graphs of the distance between both shoulder joints using the three-dimensional position information of the both shoulders and the distance between both shoulder joints according to time using the time corresponding between the start of the first gait section to the completion of the third gait section.

Figure 9:
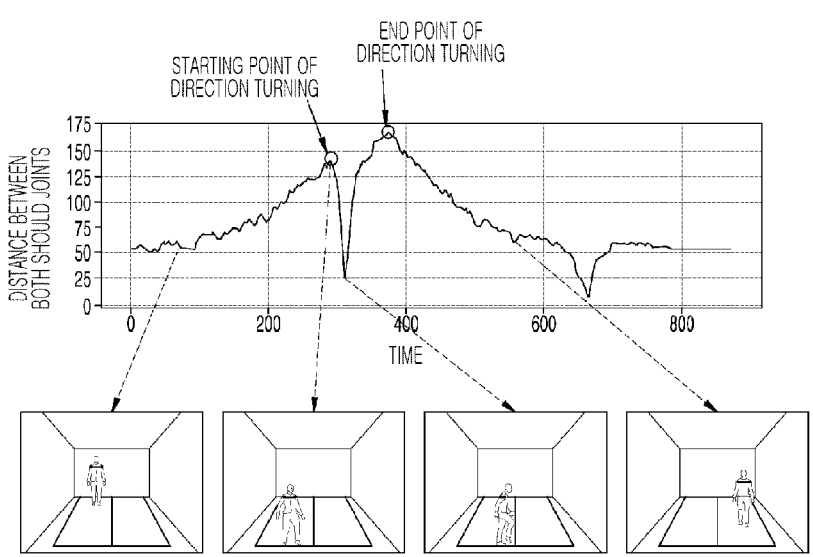

FIG. 9 illustrates a change graph for the distance between both shoulder joints generated by the fourth calculation unit 156 using the distance between both shoulder joints and the time corresponding between the start of the first gait section and the completion of the third gait section. From FIG. 9, it may be seen that as walking from the starting point towards the camera, the distance between both shoulder joints gradually becomes longer, as turning the direction, the distance between both shoulder joints becomes shorter, and as walking towards the starting point again, the distance between both shoulder joints becomes longer. Here, if both shoulders overlap each other when turning the direction, the distance between both shoulder joints may become 0.

The fourth calculation unit 156 may extract a first point at which the distance between both shoulder joints gradually increases and vertically descends from a first value (e.g., 140 in FIG. 9) to the second value (e.g., 25 in FIG. 9), and a second point at which the distance between both shoulder joints vertically rises from the second value (e.g., 25 in FIG. 9) to a third value (e.g., 160) on the change graph. Here, from FIG. 9, the first point may represent the starting point of the direction turning, and the second point may represent the end point of the direction turning.

The fourth calculation unit 156 may calculate the difference between the first time corresponding to the first point and the second time corresponding to the second point as the direction turning time.

The fourth calculation unit 156 may calculate the number of swing phases corresponding between the first time and the second time as the number of strides during the turning of the direction on the velocity graph for the both feet in FIG. 8.

Figure 10:
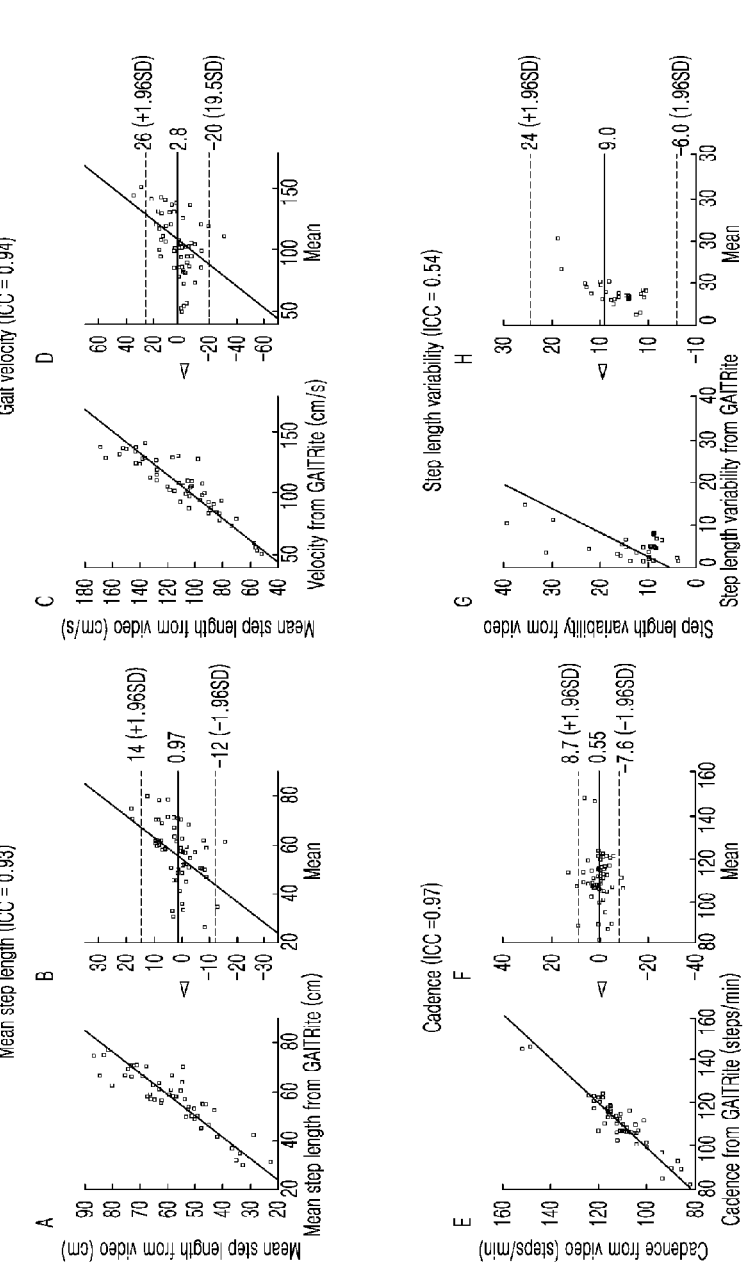

FIG. 10 illustrates the results of gait index analysis according to the present embodiment and the results of gait index analysis using an existing pressure sensor. In order to compare whether the results of gait index analysis according to the present embodiment are consistent with the results of gait index analysis using the existing pressure sensor, 15 normal people and 16 Parkinson's disease patients with gait disorders were recruited as target groups. The target groups walked 7 m round trip in a hallway equipped with a pressure sensor-based gait measuring device. The starting point and direction turning point are marked with lines on the floor. Gait indexes (step length, gait velocity, and number of strides) obtained from a total of 31 subjects are shown high agreement regardless of gait toward the camera, gait away from the camera, and the shortness and longness of the stride.

Figures 11, 12:
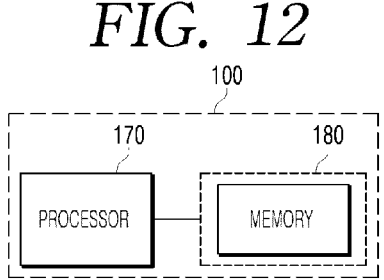
FIG. 12 is a block diagram schematically illustrating a configuration of a gait analysis apparatus according to another embodiment.

FIG. 11 is an analysis of images of 32 Parkinson's disease patients whose gait videos were recorded in the same manner as FIG. 10 to evaluate whether the gait analysis algorithm according to the present embodiment reflects the gait abnormalities of Parkinson's disease patients with gait disorders. Gait indexes when the drug was effective (med-on) and when the drug was stopped for more than 12 hours were compared with each other and it was observed that there was a significant improvement in gait disability by observing the improvement in gait caused by the drug. These results illustrate that the gait analysis algorithm according to the present embodiment may extract objective and quantitative parameters while illustrating a high correlation with current clinical measures.

FIG. 12 is a block diagram schematically illustrating a configuration of a gait analysis apparatus according to another embodiment. In the following description, parts that overlap with the description of FIGS. 1 to 11 will be omitted. With reference to FIG. 12, a gait analysis apparatus 100 according to another embodiment may include a processor 170 and a memory 180.

In the present embodiment, the processor 170 may process the function performed by the gait analysis unit 150 including the collection unit 151, the first calculation unit 152, the estimation unit 153, the second calculation unit 154, the third calculation unit 155, and the fourth calculation unit 155 of FIG. 3.

The processor 170 may control the entire operation of the user information generating device 200. Here, 'processor' may mean, for example, a data processing device built into hardware that has a physically structured circuit to perform a function expressed by code or instructions included in a program. Examples of data processing device built into hardware include a microprocessor, a central processing unit (CPU), a processor core, a multiprocessor, an application-specific integrated circuit (ASIC), a field programmable gate array (FPGA), etc., but the scope of the present disclosure is not limited thereto.

The memory 180 is operatively connected to the processor 170 and may store at least one instruction in association with an operation executed by the processor 170.

In addition, the memory 180 may perform a function of temporarily or permanently storing data processed by the processor 170, and, as an example, may store data stored in the database 270 of FIG. 4. Here, the memory 180 may include magnetic storage media or flash storage media, but the scope of the present disclosure is not limited thereto. The memory 180 may include internal memory and/or external memory, volatile memory such as DRAM, SRAM, or SDRAM, one time programmable ROM (OTPROM), PROM, EPROM, EEPROM, mask ROM, flash ROM, Non-volatile memory such as NAND flash memory or NOR flash memory, flash drive such as SSD, compact flash (CF) card, SD card, Micro-SD card, Mini-SD card, Xd card, or memory stick, or a storage device such as HDD.

Figure 13:
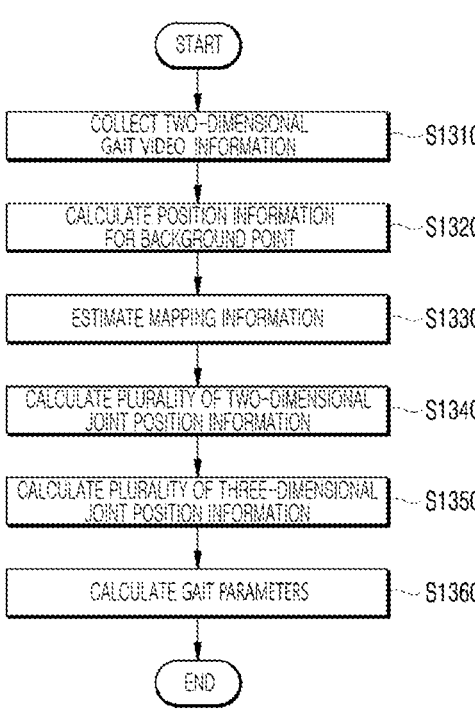
FIG. 13 is a flowchart for explaining a gait analysis method according to the present embodiment.

FIG. 13 is a flowchart for explaining the gait analysis method according to the present embodiment. In the following description, parts that overlap with the description of FIGS. 1 to 12 will be omitted.

With reference to FIG. 13, in step S1310, the gait analysis apparatus 100 may collect the two-dimensional gait video of the subject's gait situation during a preset time using the camera. The gait analysis apparatus 100 may collect the two-dimensional gait videos obtained by capturing the first gait section in which the subject walks forward in a straight line a preset distance from the starting point toward the camera, the second gait section in which the subject walks to turn the direction while passing through the direction turning point after the first gait section, and the third gait section in which the subject walks backward to return to the starting point after the second gait section.

In addition, the gait analysis apparatus 100 may determine whether the two-dimensional gait video satisfies a preset condition to allow collection of two-dimensional video data that satisfies the preset condition. Here, the preset conditions may include the first condition in which the camera has to capture an image at a fixed position, the second condition in which the subject's feet has to be included in the two-dimensional gait video, and the third condition in which a zoom-in or zoom-out operation is not performed while capturing the two-dimensional gait video.

In step S1320, the gait analysis apparatus 100 may receive the three-dimensional information of the capturing space to generate the three-dimensional coordinate system based on at least one frame of the two-dimensional gait video. Here, the capturing space information may include first to third parameters. The first parameter 510 may represent the width (e.g., 4 m) of the floor corresponding to the starting point within the capturing space. The second parameter 520 may represent the height (e.g., 3 m) of the wall in contact with the width of the floor. The third parameter 530 may represent the distance (e.g., 7 m) between the starting point and the direction turning point. In addition, the gait analysis apparatus 100 may receive the starting point of the three-dimensional coordinate system to generate the three-dimensional coordinate system. Here, the starting point of the three-dimensional coordinate system may be received by touching on at least one frame of the two-dimensional gait video.

In step S1330, the gait analysis apparatus 100 may receive a plurality of feature points on the generated three-dimensional coordinate system, calculate the three-dimensional feature point coordinates, and calculate the two-dimensional feature point coordinates for the plurality of feature points using the resolution information of the camera. The gait analysis apparatus 100 may request the subject or the photographer to input a plurality of feature points corresponding to the capturing space information through the electronic device 200, and receive a plurality of corresponding feature point input results corresponding to the capturing space information input by the subject or the photographer through the electronic device 200. The gait analysis apparatus 100 may calculate the coordinates of a plurality of feature points by applying the plurality of received feature points to the three-dimensional coordinate system. The gait analysis apparatus 100 may calculate the two-dimensional feature point coordinates for the plurality of feature points using the resolution information of the camera (number of horizontal and vertical pixels of the two-dimensional gait video frame).

In step S1340, the mapping information between the three-dimensional feature point coordinates and the two-dimensional feature point coordinates may be estimated by using the three-dimensional feature point coordinates, the two-dimensional feature point coordinates, and the internal index of the camera. The gait analysis apparatus 100 may use the Perspective-n-point (PNP) algorithm. The PNP algorithm may estimate the position and the direction of the camera (rotation information and horizontal movement information) calibrated when four or more points are known, which correspond to the coordinates of a specific three-dimensional space (three-dimensional feature point coordinates in the present embodiment) and a specific image plane (two-dimensional gait video frame in the present embodiment). Here, the internal index of the camera may include focal length information given based on the resolution of the camera and center information of the two-dimensional gait video frame included in the two-dimensional gait video. The mapping information may include the rotation information of the camera and the horizontal movement information of the camera.

In step S1350, the gait analysis apparatus 100 may calculate a plurality of two-dimensional joint position information for the subject from the two-dimensional gait video. The gait analysis apparatus 100 may calculate two-dimensional joint position information using open source algorithms including Openpose. The gait analysis apparatus 100 uses not all of the plurality of two-dimensional joint position information but only some information to calculate the gait parameters, thereby capable of extracting position information of the both feet including the big toe, little toe, and ankle, and position information of the both shoulders from the two-dimensional joint position information.

In step S1360, the gait analysis apparatus 100 may calculate the plurality of three-dimensional joint position information corresponding to the plurality of two-dimensional joint position information using the plurality of two-dimensional joint position information, the internal index of the camera, and the mapping information. The gait analysis apparatus 100 may use the PNP algorithm to calculate three-dimensional joint position information. In the above-mentioned Equation 1, s represents the scale factor, $p_{image}$ represents the position information of the both feet including the big toe, little toe, and ankle, and the position information of both shoulders as the two-dimensional joint position information calculated by the second calculation unit 154, K represents the given camera internal index, [R/T] represents the external factor of the camera, that is, mapping information (rotation information and horizontal movement information of the camera). The third calculation unit 155 may calculate $p_{world}$, that is, the position information of the both feet including the big toe, little toe, and ankle, and the position information of both shoulders as three-dimensional joint position information by applying these to Equation 1.

In step S1370, the gait analysis apparatus 100 may calculate the gait parameters for the subject using the three-dimensional joint position information. The gait analysis apparatus 100 may generate a velocity graph for the both feet using the three-dimensional position information of the both feet, and the distance and time corresponding to those between the start of the first gait section to the completion of the third gait section. The gait analysis apparatus 100 may set the first period in which one foot moves at the fastest velocity as the swing phase on the velocity graph, and the second period in which the other foot comes into contact with the ground corresponding to the first period as the stance phase. The gait analysis apparatus 100 may calculate the gait parameters including one or more of step length, gait velocity, number of strides per hour, variability of step length and gait velocity, and difference between left and right step lengths using the swing phase and the stance phase for each of both feet.

The gait analysis apparatus 100 may calculate the step length as the distance between two stance phases for one foot. The gait analysis apparatus 100 may calculate the gait velocity as the sum of the step lengths per unit time. The gait analysis apparatus 100 may calculate the number of strides as the number of swing phases per unit time. The gait analysis apparatus 100 may calculate the variability of step length and gait velocity by dividing the standard deviation of the step length and gait velocity by the average step length or average gait velocity. The gait analysis apparatus 100 may calculate the difference between the left and right step lengths as the difference between the step length calculated for the left foot and the step length calculated for the right foot of the both feet.

The gait analysis apparatus 100 may calculate direction turning information including the direction turning time from the second gait section and the number of strides at the direction turning time using the three-dimensional position information of both shoulders, and provide the calculated direction turning information to the gait parameters.

When calculating direction turning information, the gait analysis apparatus 100 may generate change graphs of the distance between both shoulder joints using the three-dimensional position information of the both shoulders and the distance between both shoulder joints according to time using the time corresponding between the start of the first gait section to the completion of the third gait section. The gait analysis apparatus 100 may extract the first point at which the distance between both shoulder joints gradually increases and vertically descends from the first value to the second value, and the second point at which the distance between both shoulder joints vertically rises from the second value to a third value on the change graph. The gait analysis apparatus 100 may calculate the difference between the first time corresponding to the first point and the second time corresponding to the second point as the direction turning time. The gait analysis apparatus 100 may calculate the number of swing phases corresponding between the first time and the second time as the number of strides during the turning of the direction on the velocity graph for the both feet.

The embodiments according to the present disclosure described above may be implemented in the form of a computer program that may be executed through various components on a computer, and such a computer program may be recorded on a computer-readable medium. In this case, the media may include magnetic media such as hard disks, floppy disks, and magnetic tapes, optical recording media such as CD-ROMs and DVDs, magneto-optical media such as floptical disks, and hardware devices specifically configured to store and execute program instructions ROM, RAM, and flash memory.

Meanwhile, the computer program may be designed and configured specifically for the present disclosure, or may be known and available to those skilled in the art of computer software. Examples of computer programs may include not only machine language code such as that generated by a compiler, but also high-level language code that may be executed by a computer using an interpreter or the like.

In the specification (particularly in the claims) of the present disclosure, the use of the term "the" and similar referential terms may refer to both the singular and the plural. In addition, when a range is described in the present disclosure, it includes inventions that apply individual values within the above range (unless there is a statement to the contrary), which is the same as if each individual value constituting the above range was described in the detailed description of the invention.

Unless there is an explicit order or statement to the contrary regarding the steps constituting the method according to the present disclosure, the steps may be performed in any suitable order. The present disclosure is not necessarily limited by the order of description of the above steps. The use of any examples or illustrative terms (e.g., etc.) in the present disclosure is merely to describe the present disclosure in detail, and unless limited by the claims, the scope of the present disclosure is not limited by the examples or illustrative terms. In addition, those skilled in the art will recognize that various modifications, combinations and changes may be made depending on design conditions and factors within the scope of the appended claims or their equivalents.

Therefore, the spirit of the present disclosure is not limited to the above-described embodiments, and the scope of the claims described below as well as all scopes equivalent to or equivalently changed from the scope of the claims are within the scope of the spirit of the present disclosure.

What is claimed is:

1. A gait analysis method for analyzing gait of a subject, the method comprising:

collecting a two-dimensional gait video of a subject's gait situation during a preset time, which is captured using a camera;

generating a three-dimensional coordinate system based on at least one frame of the two-dimensional gait video by receiving three-dimensional information of a capturing space;

calculating three-dimensional feature point coordinates by receiving a plurality of feature points on the three-dimensional coordinate system, and calculating two-dimensional feature point coordinates for the plurality of feature points using resolution information of the camera;

estimating mapping information between the three-dimensional feature point coordinates and the two-dimensional feature point coordinates by using the three-dimensional feature point coordinates, the two-dimensional feature point coordinates, and an internal index of the camera calculating a plurality of two-dimensional joint position information for the subject from the two-dimensional gait video;

calculating a plurality of three-dimensional joint position information corresponding to the plurality of two-dimensional joint position information using the plurality of two-dimensional joint position information, the internal index of the camera, and the mapping information; and calculating gait parameters for the subject using the three-dimensional joint position information.

2. The gait analysis method of claim 1, wherein the collecting of a two-dimensional gait video includes:

collecting two-dimensional gait videos obtained by capturing a first gait section in which the subject walks forward in a straight line a preset distance from a starting point toward the camera, a second gait section in which the subject walks to turn a direction while passing through a direction turning point after the first gait section, and a third gait section in which the subject walks backward to return to the starting point after the second gait section.

3. The gait analysis method of claim 2, wherein the generating of a three-dimensional coordinate system includes:

receiving three-dimensional information of a capturing space including a first parameter that represents a width of a floor corresponding to a starting point within the capturing space, a second parameter that represents a height of a wall in contact with the width of the floor, and a third parameter that represents a distance between the starting point and the direction turning point;

receiving a starting point of the three-dimensional coordinate system in the capturing space; and generating the three-dimensional coordinate system using three-dimensional information of the capturing space and the starting point.

4. The gait analysis method of claim 2, wherein the calculating of a plurality of two-dimensional joint position information includes:

extracting position information of both feet including the big toe, little toe, and ankle, and position information of the both shoulders from the plurality of two-dimensional joint position information.

5. The gait analysis method of claim 4, wherein the calculating of gait parameters includes:

generating a velocity graph for the both feet using the three-dimensional position information of the both feet, and the distance and time corresponding to those between the start of the first gait section to the completion of the third gait section;

setting a first period in which one foot moves at the fastest velocity as a swing phase on the velocity graph, and a second period in which the other foot comes into contact with the ground corresponding to the first period as a stance phase; and calculating gait parameters including one or more of step length, gait velocity, number of strides per hour, variability of step length and gait velocity, and difference between left and right step lengths using the swing phase and the stance phase for each of both feet.

6. The gait analysis method of claim 5, wherein, in the calculating of gait parameters, the length is calculated as a distance between two stance phases for one foot, the gait velocity is calculated as a sum of the step lengths per unit time, the number of strides is calculated as the number of swing phases per unit time, the variability of step length and gait velocity is calculated by dividing a standard deviation of the step length and the gait velocity by an average step length or an average gait velocity, and the difference between the left and right step lengths is calculated as a difference between the step length calculated for the left foot and the step length calculated for the right foot of the both feet.

7. The gait analysis method of claim 6, wherein the calculating of gait parameters includes:

calculating direction turning information including the direction turning time from the second gait section and the number of strides at the direction turning time using the three-dimensional position information of both shoulders; and providing the direction turning information to the gait parameters.

8. The gait analysis method of claim 7, wherein the calculating of direction turning information includes:

generating a change graph of the distance between both shoulder joints using the three-dimensional position information of the both shoulders and the distance between both shoulder joints according to time using the time corresponding between the start of the first gait section to the completion of the third gait section;

extracting a first point at which the distance between the both shoulder joints gradually increases and vertically descends from a first value to a second value, and a second point at which the distance between the both shoulder joints vertically rises from the second value to a third value on the change graph;

calculating a difference between a first time corresponding to the first point and a second time corresponding to the second point as the direction turning time; and calculating the number of swing phases corresponding between the first time and the second time as the number of strides during the turning of the direction on the velocity graph for the both feet.

9. The gait analysis method of claim 1, wherein the collecting of a two-dimensional gait video further includes:

allowing collection of two-dimensional video data that satisfies the preset condition by determining whether the two-dimensional gait video satisfies a preset condition, and the preset condition includes a first condition in which the camera has to capture an image at a fixed position, a second condition in which the subject's feet has to be included in the two-dimensional gait video, and a third condition in which a zoom-in or zoom-out operation is not performed while capturing the two-dimensional gait video.

10. The gait analysis method of claim 1, wherein in the estimating of mapping information, the internal index of the camera includes focal length information given based on resolution of the camera and center information of a two-dimensional gait video frame included in the two-dimensional gait video, and the mapping information includes rotation information of the camera and horizontal movement information of the camera.

11. A gait analysis apparatus for analyzing gait of a subject, the apparatus comprising:

a processor; and a memory that is operatively connected to the processor and stores one more instructions executed by the processor, wherein when the memory is executed through the processor, the instruction cause the processor to collect a two-dimensional gait video of a subject's gait situation during a preset time, which is captured using a camera, generate a three-dimensional coordinate system based on at least one frame of the two-dimensional gait video by receiving three-dimensional information of a capturing space, calculate three-dimensional feature point coordinates by receiving a plurality of feature points on the three-dimensional coordinate system, and calculate two-dimensional feature point coordinates for the plurality of feature points using resolution information of the camera, estimate mapping information between the three-dimensional feature point coordinates and the two-dimensional feature point coordinates by using the three-dimensional feature point coordinates, the two-dimensional feature point coordinates, and an internal index of the camera calculate a plurality of two-dimensional joint position information for the subject from the two-dimensional gait video, calculate a plurality of three-dimensional joint position information corresponding to the plurality of two-dimensional joint position information using the plurality of two-dimensional joint position information, the internal index of the camera, and the mapping information, and calculate gait parameters for the subject using the three-dimensional joint position information.

12. The gait analysis apparatus of claim 11, wherein when collecting the two-dimensional gait video, the instruction causes the processor to collect two-dimensional gait videos obtained by capturing a first gait section in which the subject walks forward in a straight line a preset distance from a starting point toward the camera, a second gait section in which the subject walks to turn a direction while passing through a direction turning point after the first gait section, and a third gait section in which the subject walks backward to return to the starting point after the second gait section.

13. The gait analysis apparatus of claim 12, wherein, when generating the three-dimensional coordinate system, the instruction causes the processor to receive three-dimensional information of a capturing space including a first parameter that represents a width of a floor corresponding to a starting point within the capturing space, a second parameter that represents a height of a wall in contact with the width of the floor, and a third parameter that represents a distance between the starting point and the direction turning point, receive a starting point of the three-dimensional coordinate system in the capturing space, and generate the three-dimensional coordinate system using three-dimensional information of the capturing space and the starting point.

14. The gait analysis apparatus of claim 12, wherein when calculating the plurality of two-dimensional joint position information, the instruction causes the processor to extract position information of both feet including the big toe, little toe, and ankle, and position information of the both shoulders from the plurality of two-dimensional joint position information.

15. The gait analysis apparatus of claim 14, wherein, when calculating the gait parameters, the instruction causes the processor to generate a velocity graph for the both feet using the three-dimensional position information of the both feet, and the distance and time corresponding to those between the start of the first gait section to the completion of the third gait section, set a first period in which one foot moves at the fastest velocity as a swing phase on the velocity graph, and a second period in which the other foot comes into contact with the ground corresponding to the first period as a stance phase, and calculate gait parameters including one or more of step length, gait velocity, number of strides per hour, variability of step length and gait velocity, and difference between left and right step lengths using the swing phase and the stance phase for each of both feet.

16. The gait analysis apparatus of claim 15, wherein when calculating the gait parameters, the instruction causes the processor to make the step length be calculated as a distance between two stance phases for one foot, the gait velocity be calculated as a sum of the step lengths per unit time, the number of strides be calculated as the number of swing phases per unit time, the variability of step length and gait velocity be calculated by dividing a standard deviation of the step length and the gait velocity by an average step length or an average gait velocity, and the difference between the left and right step lengths be calculated as a difference between the step length calculated for the left foot and the step length calculated for the right foot of the both feet.

17. The gait analysis apparatus of claim 16, wherein, when calculating the gait parameters, the instruction causes the processor to calculate direction turning information including the direction turning time from the second gait section and the number of strides at the direction turning time using the three-dimensional position information of both shoulders, and provide the direction turning information to the gait parameters.

18. The gait analysis apparatus of claim 17, wherein, when calculating the direction turning information, the instruction causes the processor to generate a change graph of the distance between both shoulder joints using the three-dimensional position information of the both shoulders and the distance between both shoulder joints according to time using the time corresponding between the start of the first gait section to the completion of the third gait section, extract a first point at which the distance between the both shoulder joints gradually increases and vertically descends from a first value to a second value, and a second point at which the distance between the both shoulder joints vertically rises from the second value to a third value on the change graph, calculate a difference between a first time corresponding to the first point and a second time corresponding to the second point as the direction turning time, and calculate the number of swing phases corresponding between the first time and the second time as the number of strides during the turning of the direction on the velocity graph for the both feet.

19. The gait analysis apparatus of claim 11, wherein when collecting the two-dimensional gait video, the instruction causes the processor to determine whether the two-dimensional gait video satisfies a preset condition to allow collection of two-dimensional video data that satisfies the preset condition, and the preset condition includes a first condition in which the camera has to capture an image at a fixed position, a second condition in which the subject's feet has to be included in the two-dimensional gait video, and a third condition in which a zoom-in or zoom-out operation is not performed while capturing the two-dimensional gait video.

20. The gait analysis apparatus of claim 11, wherein, when estimating the mapping information, the instruction causes the processor to provide the internal index of the camera with focal length information given based on resolution of the camera and center information of a two-dimensional gait video frame included in the two-dimensional gait video, and provide the mapping information with rotation information of the camera and horizontal movement information of the camera.

* * * * *